(12) United States Patent
Scheu et al.

(10) Patent No.: US 9,714,615 B2
(45) Date of Patent: Jul. 25, 2017

(54) IGNITION FILTER FOR COMPRESSED AIR ENGINE

(71) Applicants: R J Scheu, Ketchum, ID (US); Brad Richards, Twin Falls, ID (US)

(72) Inventors: R J Scheu, Ketchum, ID (US); Brad Richards, Twin Falls, ID (US)

(73) Assignee: R.J. Scheu, Ketchum, ID (US)

( * ) Notice: Subject to any disclaimer, the term of this patent is extended or adjusted under 35 U.S.C. 154(b) by 121 days.

(21) Appl. No.: 14/592,137

(22) Filed: Jan. 8, 2015

(65) Prior Publication Data
US 2016/0201579 A1 Jul. 14, 2016

(51) Int. Cl.
*F02D 13/02* (2006.01)
*F02B 21/00* (2006.01)

(52) U.S. Cl.
CPC .......... *F02D 13/0223* (2013.01); *F02B 21/00* (2013.01); *Y02T 10/18* (2013.01)

(58) Field of Classification Search
CPC ... B60K 6/12; B60K 3/00; B60K 3/04; B60K 7/0023; B60K 2006/123; F01K 25/06; F01K 27/00
See application file for complete search history.

(56) References Cited

U.S. PATENT DOCUMENTS

| | | | |
|---|---|---|---|
| 3,885,387 A | 5/1975 | Simington | |
| 3,925,984 A | 12/1975 | Holleyman et al. | |
| 4,018,050 A | 4/1977 | Murphy | |
| 4,102,130 A | 7/1978 | Stricklin | |
| 4,124,978 A | 11/1978 | Wagner | |
| 4,210,062 A | 7/1980 | Plesko | |
| 4,292,804 A | 10/1981 | Rogers | |
| 4,378,004 A * | 3/1983 | Petrie | F02P 7/035 123/406.61 |
| 4,380,904 A | 4/1983 | Zappia | |
| 4,519,038 A * | 5/1985 | Matsui | F02P 3/0456 123/406.65 |
| 4,715,181 A | 12/1987 | Cestero | |
| 4,769,988 A | 9/1988 | Clark | |
| 4,896,505 A | 1/1990 | Holleyman | |
| 5,947,090 A * | 9/1999 | Maeda | F02D 41/20 123/490 |
| 6,304,023 B1 * | 10/2001 | Chan | F02P 1/00 123/169 R |
| 6,311,486 B1 | 11/2001 | Negre et al. | |
| 6,948,299 B2 | 9/2005 | Osborne | |

(Continued)

FOREIGN PATENT DOCUMENTS

DE 10019809 10/2001

OTHER PUBLICATIONS

English Abstract and English machine translation of the specification and abstract of DE10019809. Oct. 31, 2001.

(Continued)

*Primary Examiner* — Sizo Vilakazi
(74) *Attorney, Agent, or Firm* — Holland & Hart LLP

(57) ABSTRACT

A method for controlling an electronically actuated valve is described. An ignition signal for a combustion engine is received. The ignition signal is filtered. A control pulse for controlling an electronically actuated valve is generated based at least on the filtered ignition signal. The electronically actuated valve may control the release of compressed gas.

20 Claims, 14 Drawing Sheets

(56) References Cited

U.S. PATENT DOCUMENTS

| | | |
|---|---|---|
| 7,370,630 B2 | 5/2008 | Turner et al. |
| 8,464,503 B2 | 6/2013 | McCuin et al. |
| 2002/0044050 A1* | 4/2002 | Derbyshire ......... B60C 23/0401 340/442 |
| 2005/0231191 A1* | 10/2005 | Tsuji ................... F02D 41/0097 324/164 |
| 2006/0191261 A1 | 8/2006 | Bailey |
| 2010/0241302 A1* | 9/2010 | Shimizu .............. F01L 1/34403 701/31.4 |
| 2011/0308241 A1 | 12/2011 | Huff et al. |
| 2014/0245727 A1* | 9/2014 | Kahn ........................ F02C 7/00 60/325 |

OTHER PUBLICATIONS

PCT International Search Report for corresponding PCT International Patent Application No. PCT/US2015/064441, mailed Feb. 18, 2016.

* cited by examiner

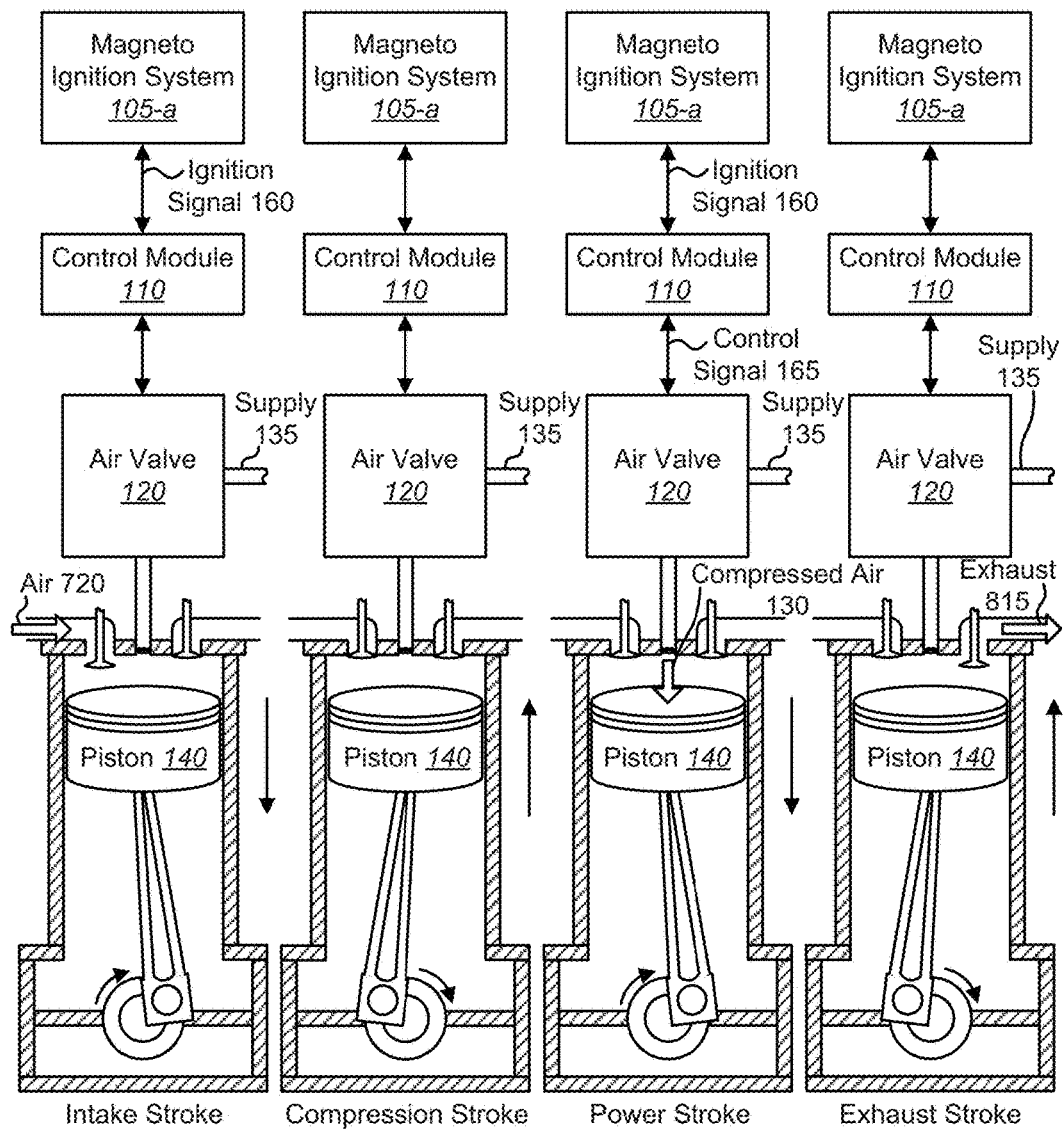

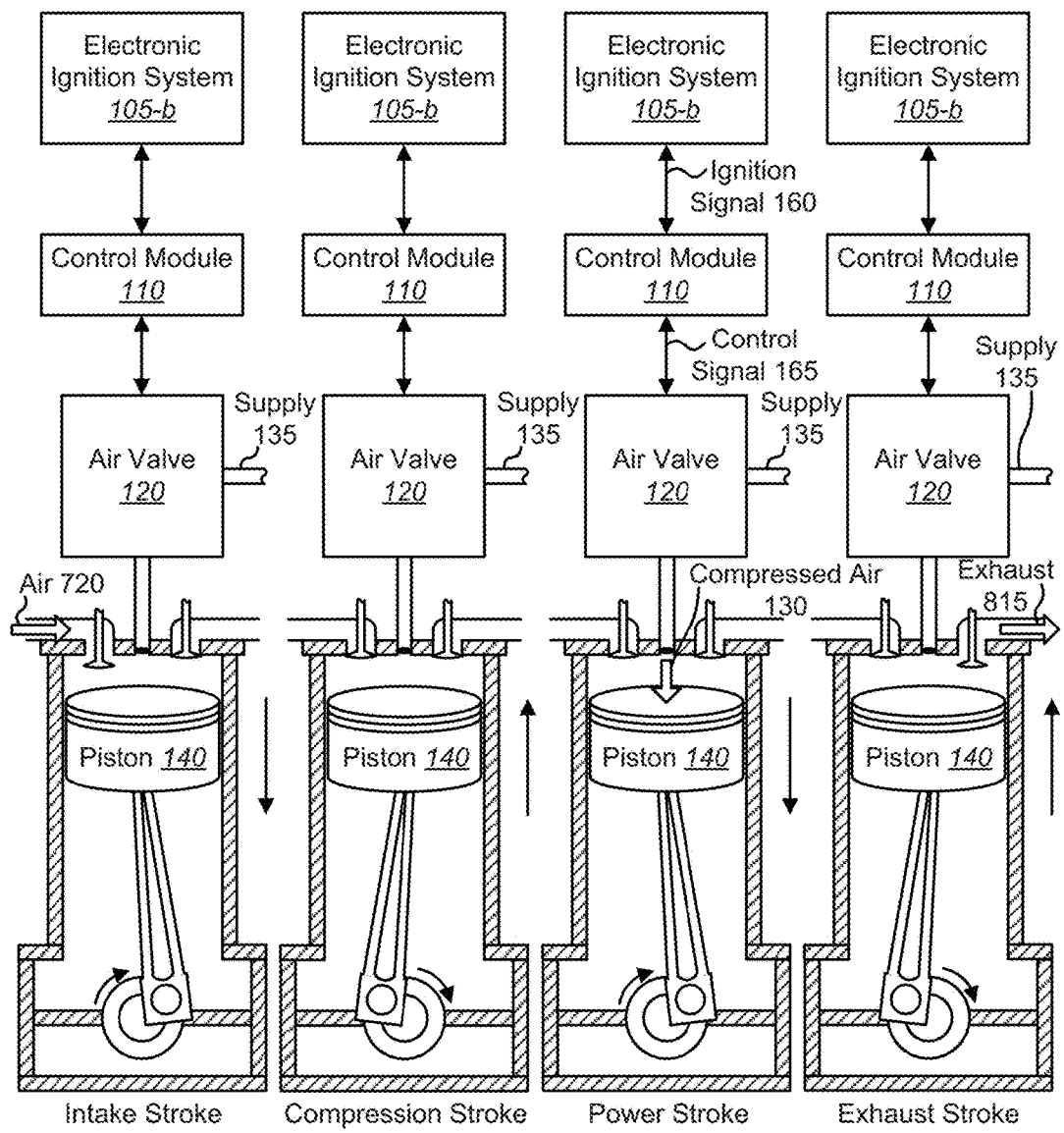

IGNITION FILTER FOR COMPRESSED AIR ENGINE

BACKGROUND

Internal combustion engines have revolutionized the world that we live in. In general, internal combustion engines use combustion within the engine to generate useful mechanical energy. For example, fuel and an oxidizer may be combusted within a cylinder to force a piston down and turn a crank shaft. The turning crank shaft can then be used to do work. Internal combustion engines are used in a variety of applications. For example, internal combustion engines are used as a power source for automobiles, motorcycles, locomotives, ships, airplanes, electrical power generators, snowmobiles, lawnmowers, string trimmers, chain saws, jet skis, mopeds, and go karts, just to name a few.

Recently, there has been interest in converting internal combustion engines into compressed air engines. That is, using compressed air rather than combustion to generate useful mechanical energy. However, there are many challenges to converting an internal combustion engine into a compressed air engine.

SUMMARY

In at least one embodiment, a method for controlling an electronically actuated valve is described. An ignition signal for a combustion engine is received. The ignition signal is filtered. A control pulse for controlling an electronically actuated valve is generated based at least on the filtered ignition signal. The electronically actuated valve may control the release of compressed gas. In one example, the compressed gas may be compressed air.

In some embodiments, filtering the ignition signal includes triggering on at least a portion of the ignition signal to transform the ignition signal into a digital pulse. In some cases, filtering the ignition signal includes removing any stray voltage spikes from the digital pulse.

In some embodiments, an engine position of the combustion engine may be identified based at least on a determined time of the digital pulse. In some embodiments, a rotational speed of the combustion engine may be identified based on a time difference between subsequent digital pulses.

In some embodiments, each digital pulse may be identified. In some cases (when the ignition system does not produce wasted ignition signals, for example), a digital pulse is output for each identified digital pulse. In other cases (when the ignition system produces wasted ignition signals, for example), a digital pulse may be output for every two identified digital pulses.

In some embodiments, generating the control pulse includes determining a start time for the control pulse based on at least one of a determined engine position and a determined rotational speed of the combustion engine. In some embodiments generating the control pulse includes determining a dwell time for the control pulse based on at least one of a determined engine position and a determined rotational speed of the combustion engine. In various embodiments, the control pulse may be generated to have the determined start time and/or the determined dwell time.

In various embodiments, the ignition signal may be from an ignition system of the combustion engine. The ignition signal may be intended to cause a spark plug to spark (to trigger a combustion reaction, for example).

An apparatus for controlling an electronically actuated valve is also described. The apparatus includes a processor and memory in electronic communication with the processor. The memory stores instructions that when executed by the processor cause the processor to: receive an ignition signal for a combustion engine, filter the ignition signal, and generate a control pulse for controlling an electronically actuated valve based at least on the filtered ignition signal. The electronically actuated valve may control the release of compressed gas.

Any of the aspects of the invention detailed above may be combined with any other aspect of the invention detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

FIGS. 8A-8D illustrate an example of a four-stroke engine that has a magneto ignition system.

FIGS. 8E-8H illustrate an example of a four-stroke engine that has an electronic ignition system.

Throughout the drawings, identical reference numbers designate similar, but not necessarily identical, elements.

DETAILED DESCRIPTION

Internal combustion engines operate by combusting fuel and an oxidizer in a combustion chamber. A mixture of fuel and oxidizer (typically air) is compressed in a combustion chamber and ignited. In many cases, the mixture of fuel and oxidizer is ignited by a spark plug. Upon ignition, the mixture of fuel and oxidizer combust resulting in highly exothermic chemical reaction. High-temperature and high-pressure gases expand within the combustion chamber applying a force to the engine. For example, the high-temperature and high-pressure gasses may be used to drive a piston, which turns a crank shaft. The rotation of the crank shaft can then be used to do work (propel an automobile, for example).

When an internal combustion engine is converted to be a compressed air engine, expanding compressed air rather than the expanding gasses of combustion is used to drive the piston and turn the crank shaft. In some cases, the compressed air may be released into the combustion chamber via a controlled compressed air valve. In at least one example, the signals from the ignition system may be used to control the compressed air valve.

Since combustion is no longer required, the necessary components for combustion (e.g., fuel systems, spark plugs, ignition systems) may no longer be needed. Often these systems are disregarded. However, as described in the systems and methods described below, the ignition system may be repurposed to control the compressed air valve.

The ignition system may be configured to provide electrical current at high voltages to the spark plug. This high voltage ignition signal is needed in order to spark across the gap of the spark plug and ignite the fuel and oxidizer mixture. Unfortunately, the high voltage ignition signal tends to be noisy.

In at least one example, the ignition signal may be filtered and processed. A control signal may be generated based on the filtered and processed ignition signal. In one example, the control signal may include a pulse indicating a time and a duration that the compressed air valve should open. In some cases, the timing of the pulse and the duration of the pulse (e.g., dwell time) may be determined based on the timing of ignition signals. As will be described below the systems and methods described herein may be used to control a compressed air valve based on the ignition signal.

Figure 1:
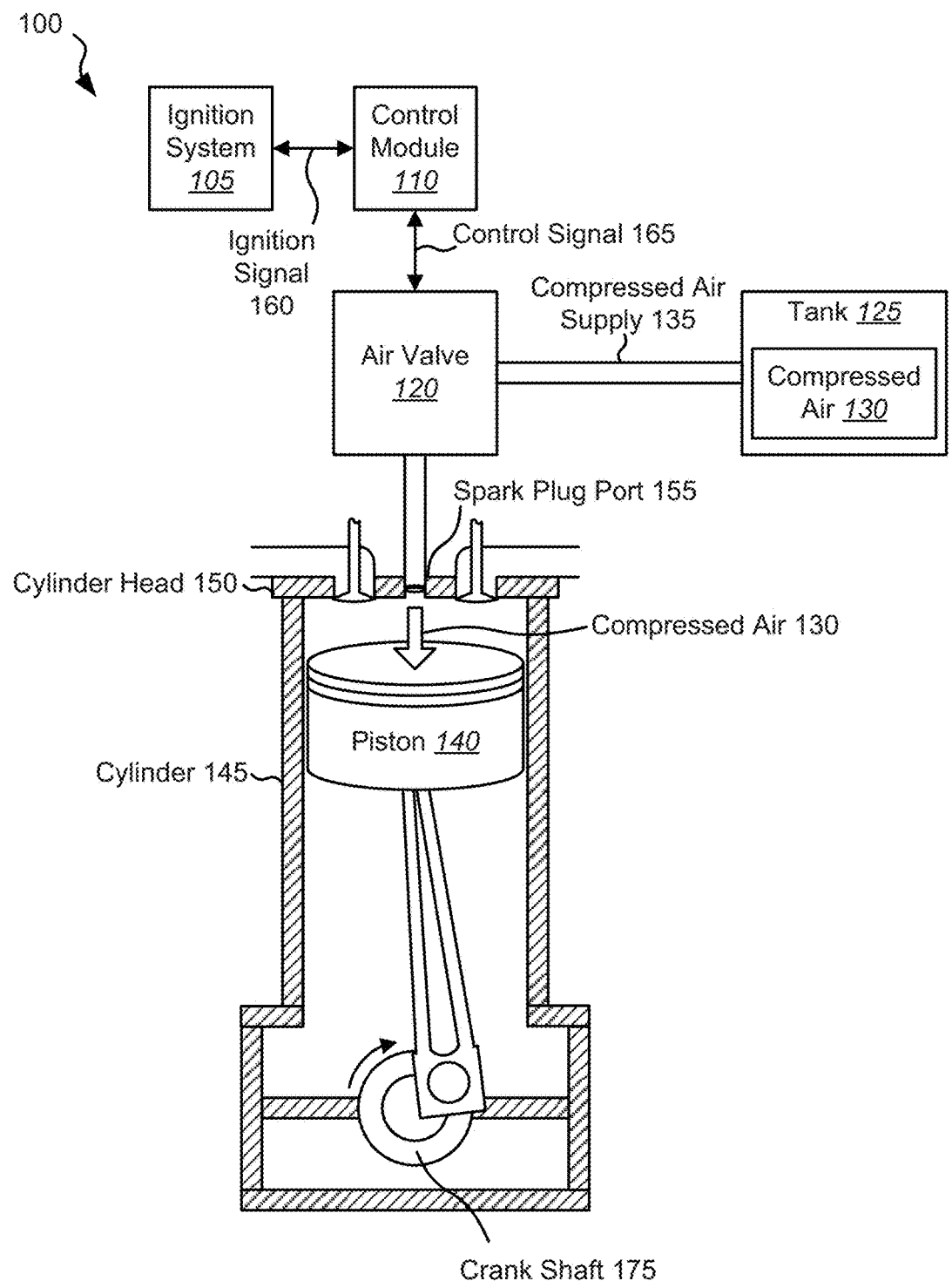
FIG. 1 is a block diagram illustrating one embodiment of an environment 100 in which the present systems and methods may be implemented.

Turning now to the figures, FIG. 1 is a block diagram illustrating one embodiment of an environment 100 in which the present systems and methods may be implemented. In one embodiment, an internal combustion engine may be retrofitted to be a compressed air engine. The internal combustion engine may include a combustion chamber defined by a cylinder 145 and a cylinder head 150. A piston 140 within the cylinder 145 may be moveable within the cylinder 145 (to pump up and pump down within the cylinder 145, for example). The piston 140 may be coupled to a crank shaft 175. As the piston 140 moves up and down within the cylinder 145, the piston 145 may rotate the crank shaft 175. In some cases, the crank shaft 175 may perform work (e.g., drive a transmission, spin a lawnmower blade, etc.).

The internal combustion engine may also include an ignition system 105. Examples of ignitions systems 105 include magneto systems, mechanically timed systems (e.g., distributor systems), electronic ignition systems, and digital electronic ignitions. The ignition system 105 would typically be connected to a spark plug housed within spark plug port 155 of the cylinder head 150. The ignition system 105 may be configured to provide an ignition signal 160 to the spark plug. The ignition system 105 may normally provide a null (e.g., zero) signal. However, when the ignition system 105 determines that the spark plug should spark, the ignition system 105 may generate an ignition signal 160. The ignition signal 160 may be a high voltage electrical impulse that provides sufficient electric current to cause a spark plug to spark. In a typical internal combustion engine, the ignition signal 160 causes the spark plug to spark and ignite a mixture of fuel and compressed oxidizer, which combusts, pushing the piston 140 down causing the crank shaft 175 to rotate.

The ignition system 105 may be timed to provide the ignition signal 160 at a particular time during the piston's 140 movement to optimize the usage of the combustion reaction. For example, the ignition system 105 may be timed to provide the ignition signal 160 just before the piston 140 is at a top position within the cylinder 145 (just prior to top dead center, for example). In some embodiments, the ignition system 105 is configured to provide an ignition signal 160 based on the rotation of the engine. In the case of a two-stroke engine where combustion happens each revolution of the engine, these embodiments provide an ignition signal 160 just prior to the combustion stroke, as desired. However, in the case of a four-stroke engine where combustion happens every other revolution of the engine, these embodiments provide an ignition signal 160 just prior to the combustion stroke, as desired, and a wasted ignition signal 160 just prior to the intake stroke. In other embodiments, the ignition system 105 is configured to provide an ignition signal 160 based on the stroke of the engine. In these embodiments, the ignition system 105 may only provide an ignition signal 160 for the combustion stroke, regardless of the type of cycle (e.g., two-cycle, four-cycle, six-cycle, etc.) that is used.

When an internal combustion engine is converted into a compressed air engine, compressed air 130 instead of internal combustion is used to push the piston 140 down and rotate the crank shaft 175. Since combustion is no longer needed, the components of the engine that enable combustion (e.g., the ignition system 105, spark plug, fuel systems, etc.) are no longer needed. In some cases, components for providing compressed air 130 to the engine may replace one or more of the components that enable combustion. For example, the spark plug may be removed and an air valve 120 may be added. In one example, the air valve 120 may provide compressed air 130 into the combustion chamber via the spark plug port 155.

The air valve 120 may open or close according to a received control signal 165. When the air valve 120 is open, the air valve 120 may allow compressed air 130 to flow into the combustion chamber (e.g., the space defined by the cylinder 145, the cylinder head 150, and the piston 140). When the air valve 120 is closed, the air valve 120 may prevent the compressed air 130 from flowing into the combustion chamber. In some cases, the air valve 120 may be enabled to open for very brief periods of time (based on the duration of the "combustion stroke" and the expansion properties of the compressed air 130, for example).

The air valve 120 may receive compressed air 130 from a source of compressed air. In one example, the source of compressed air may be a tank 125 that contains compressed air 130. In another example, the source of compressed air may be an air compressor (not shown) that produces compressed air 130. It is understood that the source of compressed air may be some combination of tanks 125 and air compressors. In some embodiments, the air valve 120 may be coupled to the source of compressed air via a compressed air supply 135. In some cases, the compressed air supply 135 may condition the compressed air 130 for use by the air valve 120. Although not shown, the compressed air supply 135 may include air hoses, regulators, relief valves, etc.

For proper operation, the air valve 120 needs to be controlled to open and close based on the rotation and/or stroke of the engine. In one example, the ignition system 105, which provides ignition signals 160 based on the rotation and/or stroke of the engine, may be repurposed and used to control the air valve 120.

A control module 110 may filter the ignition signal 160 and may generate a control signal 165 based on the ignition signal 160. For example, the control module 110 may determine the speed (e.g., revolutions per minute (RPM)) of the engine based on one or more ignition signals 160 and may generate a control signal 165 indicating the time that the air valve 120 should open and the duration that the air valve 120 should remain open based on the determined speed of the engine. The air valve 120 may operate according to the received control signal 165, enabling the internal combustion engine to operate as a compressed air engine.

Although only a single cylinder 145 is shown in FIG. 1, it is understood that described systems and methods may be used to operate a plurality of cylinders 145 in various configurations. It is also understood, that the described systems and methods may be used to operate various types of engines (e.g., two-stroke, four-stroke, five-stroke, six-stroke, Otto cycle, Atkinson cycle, Miller cycle, etc.).

Figure 2:
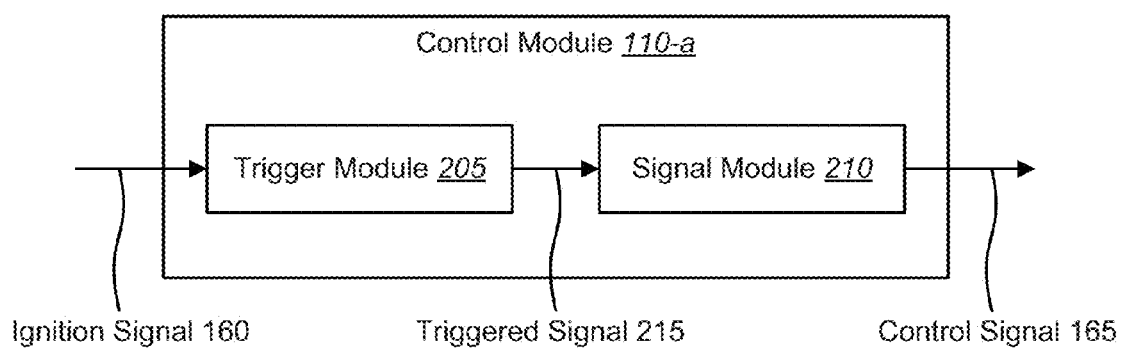
FIG. 2 is a block diagram illustrating one example of a control module.

FIG. 2 is a block diagram illustrating one example of a control module 110-*a*. The control module 110-*a* may be one example of the control module 110 illustrated in FIG. 1. The control module 110-*a* may include a trigger module 205 and a signal module 210. At least some of the operation and function of the control module 110-*a* may be performed by or in conjunction with module 205 and 210.

In some embodiments, the trigger module 205 may convert the output of the ignition system 105 into a digital signal waveform. For example, the trigger module 205 may output a triggered signal 215 based on an ignition signal 160. In some cases, the trigger module 205 may trigger upon the start of an ignition signal 160. Additionally or alternatively, the trigger module 205 may trigger upon the end of the ignition signal 160. In one example, the trigger module 205 may output a first level (e.g., zero) when the ignition system 105 is outputting a null voltage and may output a second level when the ignition system 105 is outputting an ignition signal 160. For instance, the trigger module 205 may output a first level until a first trigger event (e.g., the start of an ignition signal 160) is detected. Upon detecting the first trigger event, the trigger module 205 may output a second level. The trigger module 205 may continue to output the second level until a second trigger event (e.g., the end of the ignition signal 160) is detected. Upon detecting the second trigger event, the trigger module 205 may return to outputting the first level. In some cases, the trigger module 205 may reduce the voltage of the ignition signal 160. For example, the second level may be a reduced voltage level as compared to the high voltage ignition signal 160. In some embodiments, the triggered signal 215 may be the result of triggering and reducing the voltage of a received ignition signal 160.

In some embodiments, the signal module 210 may generate a control signal 165 based on the received triggered signal 215. In some cases, the signal module 210 may provide the received triggered signal 215 as the control signal 165. In other cases, the signal module 210 may filter, processes, and/or adjust the triggered signal 215 to produce the control signal 165. In yet other cases, the signal module 210 may generate a disparate control signal 165 based on the triggered signal 215. For instance, the signal module 210 may generate pulses at specified times and for specified durations based on the triggered signal 215. In some embodiments, the generated pulses on the control signal 165 may indicate the time that an air valve (e.g., air valve 120) should open and the duration that the air valve should remain open. Since the ignition signal 160 is provided based on the rotation of the engine (e.g., for the combustion stroke), the control signal 165, which is based on the ignition signal 160 may control the air valve to open and close during a particular portion (e.g., the combustion stroke) of the rotation of the engine.

Figure 3:
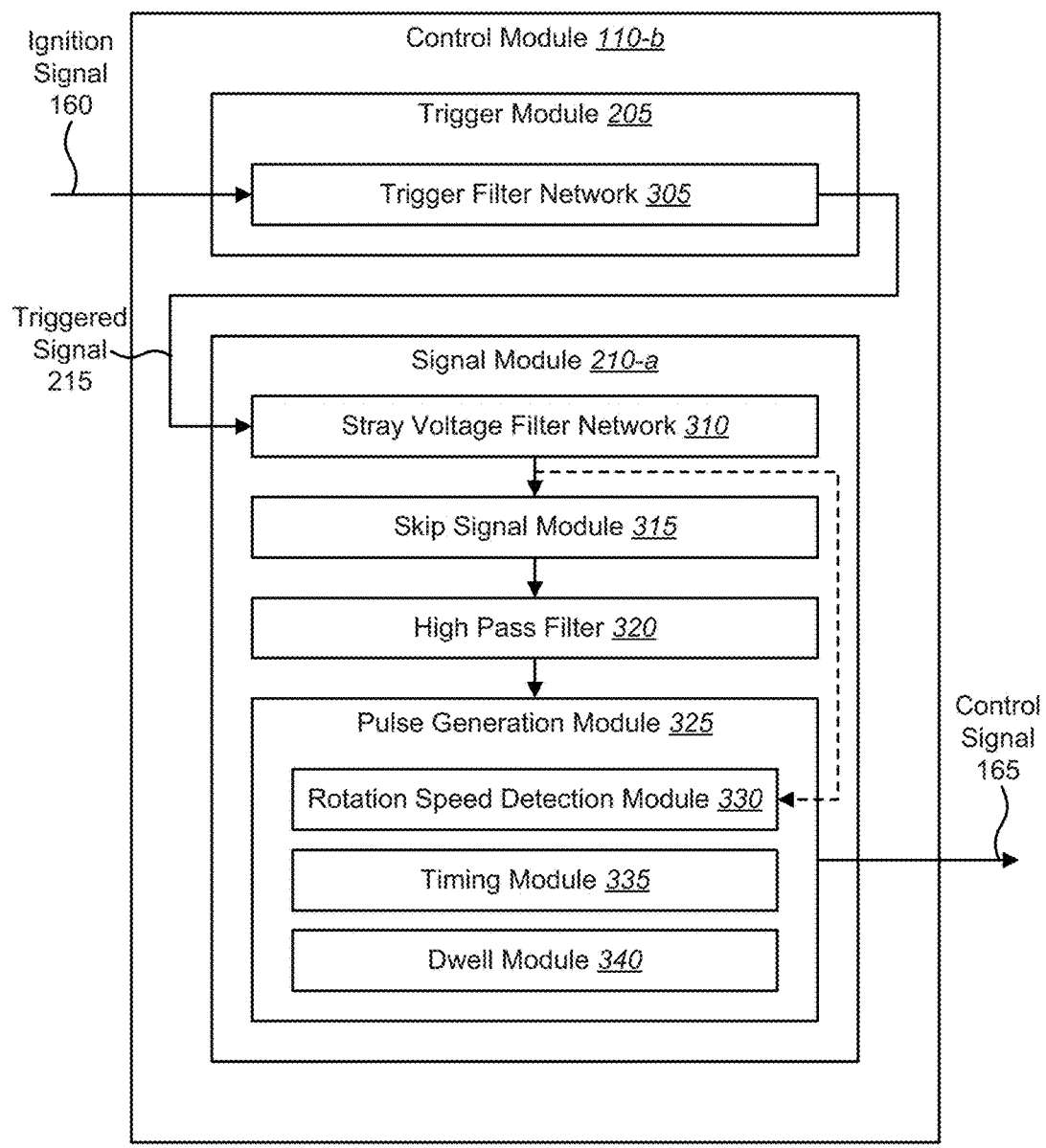
FIG. 3 is a block diagram illustrating another example of a control module.

FIG. 3 is a block diagram illustrating another example of a control module 110-*b*. The control module 110-*b* may be one example of the control module 110 illustrated in FIG. 1 or 2. The control module 110-*b* may include a trigger module 205-*a* and a signal module 210-*a*. The trigger module 205-*a* may be one example of the trigger module 205 illustrated in FIG. 2. The signal module 210-*a* may be one example of the signal module 210 illustrated in FIG. 2.

In some embodiments, the trigger module 205-*a* may include a trigger filter network 305. In some cases, the trigger filter network 305 may be a combination of components (e.g., resistors, diodes, transistors, capacitors, inductors, etc.) that trigger and/or filter an ignition signal 165 to generate the triggered signal 215. In one example, the trigger filter network 305 receive the ignition signal 160 and may trigger and filter the ignition signal 165 to produce the triggered signal 215.

In some embodiments, the signal module 210-*a* may include a stray voltage filter network 310, a skip signal module 315, a high pass filter 320, and a pulse generation module 325. At least some of the operation and functions of the signal module 210-*a* may be performed by or in conjunction with modules 310-325.

In some embodiments, the stray voltage filter network 310 may filter and remove any stray voltage from the triggered signal 215. For example, the stray voltage filter network 310 may compare voltage readings with expected voltage readings and may remove voltage readings that are not within a predetermined threshold of the expected voltage readings. In some cases, the stray voltage filter network 310 may smooth out the triggered signal 215 received from the trigger filter network 305.

In some embodiments, the skip signal module 315 may output a single signal for more than one received signals. For example, the skip signal module 315 may output a single pulse for every two pulses of the triggered signal 215. In some cases, the skip signal module 315 may output a single pulse for every two pulses of the filtered triggered signal received from the stray voltage filter network 310. The skip signal module 315 may optionally be used depending on the type of ignition system 105 being used and the type of engine (e.g., two-stroke, four-stroke, six stroke, etc.) being used. It is understood, that the skip signal module 315 may skip more or less than two pulses to provide power only during a power stroke. Accordingly, the skip signal module 315 may optionally skip pulses based on the type of engine that is being used. For example, the skip signal module 315 may be used when it is determined that the ignition system 105 provides one or more wasted signals during strokes other than the combustion stroke.

In some cases (when an ignition signal 160 is generated every rotation but the engine is a four-stroke engine, for example), the skip signal module 315 may skip signals that would have been wasted signals (e.g., signals during an exhaust/intake stroke) when operating as an internal combustion engine. These wasted signals may be harmless when operating as an internal combustion engine because sparking during an exhaust or intake stroke does not negatively impact the performance of the engine (the spark plug would spark but no combustion would occur). When operating as a compressed air engine however, these 'wasted signals' may result in the air valve 120 being opened during the intake stroke, allowing compressed air to leak out of an open intake port, wasting stored energy (e.g., the compressed air 130). The skip signal module 315 may skip signals that do not correspond with a combustion stroke (eliminate firing during the intake stroke, for example).

In some embodiments, the high pass filter 320 may remove non-zero direct current voltages. In some cases, applying the high pass filter 320 to the filtered triggered signal may provide a short duration pulse.

In some embodiments, the pulse generation module 325 may generate a control signal 165 for controlling an air valve 120. In some cases, the pulse generation module 325 may generate a control signal 165 based on the triggered signal 215 (as filtered by the stray voltage filter network 310, the skip signal module 315, and/or the high pass filter 320, for example). The control signal 165 may have one or more pulses that indicate the time and duration that the air valve 120 should be open for. In some cases, the pulse generation module 325 may determine a time and a duration for each pulse on the control signal 165 based on an analysis of the triggered signal 215. For example, the pulse generation module 325 may generate pulses at the determined time having the determined duration.

In some embodiments, the pulse generation module 325 may include a rotation speed detection module 330, a timing module 335, and a dwell module 340. At least some of the operation and functions of the pulse generation module 325 may be performed by or in conjunction with modules 330-340. For example, the pulse generation module 325 may generate a control signal 165 having pulses that are determined using the rotation speed detection module 330, the timing module 335, and/or the dwell module 340.

In some embodiments, the rotation speed detection module 330 may determine the speed (RPM, for example) of the engine. In some cases, the rotation speed detection module 330 may determine the speed of the engine based on the spacing between subsequent ignition signals 160. For example, the longer the duration between subsequent ignition signals 160 the slower the engine may be revolving and the shorter the duration between subsequent ignition signals 160 the faster the engine may be revolving. In some cases, the rotation speed detection module 330 may time the duration between subsequent ignition signals 160 and may determine a speed of the engine based on the determined duration and one or more predetermined reference values. In some cases, the rotation speed detection module 330 may determine the speed and/or the rotation of the engine using the triggered signal 215 (as filtered by the stray voltage filter network 310, for example).

In some embodiments, the timing module 335 may determine the timing of a pulse (when the air valve 120 should be opened, for example). The timing module 335 may determine a different time for a pulse than the timing of the ignition signal 160. For example, the timing module 335 may delay a pulse to account for the differences between combustion and using compressed air. In some cases, the timing of an ignition signal 160 may be advanced to account for the delay between ignition and combustion. In some cases, the timing module 335 may use the ignition signal 160 as a reference time and may select a timing for a pulse based on the properties of the air valve 120 and/or the expansion properties of compressed air 130. In some cases, the timing module 335 may determine timing based on the determined speed of the engine. For example, the timing module 335 may determine to advance the timing of pulse when the engine is rotating quickly and/or to delay the timing of a pulse when the engine is rotating slowly.

In some embodiments, the dwell module 340 may determine the duration of a pulse (the duration that the air valve 120 should remain open, for example). In some cases, the duration of a pulse may be determined based on the expansion properties of compressed air 130. In some cases, the duration of the pulse may vary based on the properties of the compressed air 130 that is being used (the pressure, the type of gas, etc., for example). In some embodiments, the dwell module 340 may determine the duration of a pulse based on the determined speed of the engine. For example, the duration of the combustion stroke may be longer when the engine is turning more slowly and the duration of the combustion stroke may be shorter when the engine is turning more quickly. Accordingly, it may be beneficial to have the air valve 120 be open for a longer duration when the engine is turning more slowly and be open for a shorter duration when the engine is turning more quickly.

In one example, the trigger filter network 305 may receive an ignition signal 160. The trigger filter network 305 may trigger upon the ignition signal 160 to generate a triggered signal 215. The trigger filter network 305 may be coupled to the stray voltage filter network 310. In one example, the trigger filter network 305 may be coupled to the stray voltage filter network 310 via a coaxial cable.

In one example, the stray voltage filter network 310 may filter the triggered signal 215. The stray voltage filter network 310 may be coupled to the skip signal module 315 and the rotation speed detection module 330. In one example, the skip signal module 315 may receive the filtered triggered signal and may determine if one or more signals should be skipped (based on a type of ignition system and a type of engine, for example). The rotation speed detection module 330 may also receive the filtered triggered signal. The rotation speed detection module 330 may determine a speed of the engine based on the filtered triggered signal.

In one example, the skip signal module 315 may be coupled to the high pass filter 320. The high pass filter 320 may filter the output of the skip signal module 315. In some cases, the output of the skip signal module 315 may be a pulse that corresponds with a combustion stroke of the engine.

In one example, the high pass filter 320 may be coupled to the pulse generation module 325. The pulse generation module 325 may generate one or more pulses for controlling an air valve 120 based on the pulse received from the high pass filter 320, the timing determined by the timing module 335, and the duration determined by the dwell module 340. In some cases, the timing module 335 and/or the dwell module 340 may additionally determine time and/or duration of a pulse based on the speed determined by the rotation speed detection module 330. The pulse generation module 325 may generate a control signal 165 having one or more pulses for controlling the air valve 120.

Figure 4:
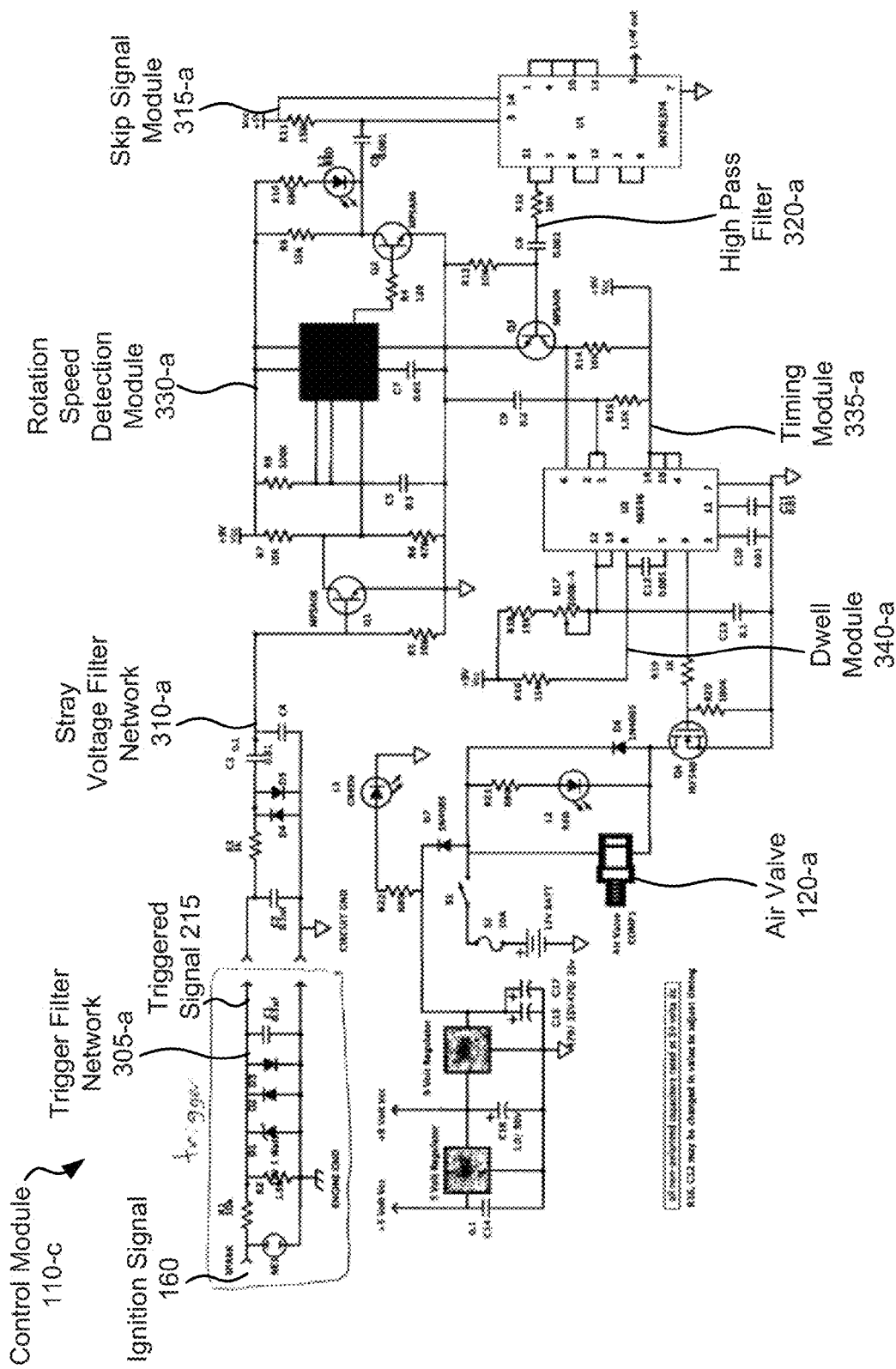
FIG. 4 is a schematic diagram illustrating yet another example of a control module.

FIG. 4 is a schematic diagram illustrating yet another example of a control module 110-c. The control module 110-c may be one example of the control modules 110 illustrated in FIG. 1, 2, or 3. The control module 110-c may include a trigger filter network 305-a, a stray voltage filter network 310-a, a skip signal module 315-a, a high pass filter 320-a, and a pulse generation module having a rotation speed detection module 330-a, a timing module 335-a, and a dwell module 340-a.

In some cases, a spark plug clip may be attached to the trigger filter network 305-a. In one example, the trigger filter network 305-a may include NE1, R1, R2, D1, D2, D3, and C1. In one example, NE1 may be a 120 volt green Neon indicator which has a built-in 39 kohm resistor. In some cases, the other 6 components may be mounted on the body of NE1, which may be mounted to the cylinder head (e.g., cylinder head 150). In one example, D1 may be a 12 volt, 1 watt Zener diode. In one example, D2 and D3 are UF4005 fast recovery diodes. In some cases, the trigger filter network 305-*a* may be connected to a signal module (main circuit, for example) via a shielded cable (e.g., a coaxial cable).

In one example, C2, C3, C4, R3, D4, and D5 form a stray voltage filter network 310-*a* that removes any stray voltage spikes and provides a clean signal to the base of Q1. Q1 may invert and buffer the signal to start the timing cycle of IC1 (rotation speed detection module 330-*a*, for example), a generic 555 timer. In some cases, R9 and C5 may set the timing period (timing period of 11 ms, for example). The output of IC1 at pin 3 may be sent to Q2 which may invert the signal and drive L1, a red LED. In one example, L1 may flash at every rotation of the flywheel (intake and power stroke of the engine for a four-stroke engine, for example).

In one example, the signal at the collector of Q2 may be coupled through a small capacitor (C6) to U1. In one embodiment, U1 may be a dual D-Type Flip Flop IC. In some cases (when the ignition signal fires for every rotation of the engine and the engine is a four-stroke engine, for example), U1 may be configured to output 1 pulse for every 2 pulses received at the input. In the case of a four-stroke engine, for example, this may eliminate the air valve 120-*a* firing during the intake stroke.

In one example, the output at pins 11 and 5 may be fed through a high pass filter 320-*a* of R12, C8, and R13 to provide a short duration pulse (a 62 us pulse, for example) to the base of Q3. The inverted signal may be taken off of the collector of Q3 and may be applied to pin 6 of U2, a generic dual 555 timer. In some configurations, U2 may have two functions. One function may be to set the timing delay (using timing module 335-*a*, for example) via C9 an R15 (a timing delay of 0.33 ms, for example). Another function may be to set the adjustable dwell time (e.g., duration of the pulse, using dwell module 340-*a*, for example) via R17, R18, and C13 (a duration of 1.65 ms to 23.65 ms, for example). The dwell time may need to be longer for slow speeds and shorter for fast speeds. In one example, the value of R17 at slow speed may be approximately 150 k ohms and may be approximately 50 k ohms for fast speed. In some embodiments, R17 may be mechanically coupled to a quarter-turn air valve. The output at pin 9 may be sent to Q4, a Power Mosfet which may drive the air valve 120-*a*. In one example, L2 is a red LED which may flash when the air valve 120-*a* fires.

In one embodiment, Pw1 may be a 9 volt regulator IC to provide power to the majority of the circuit. Pw2 may be a 5 volt regulator IC which provides power to U1.

It is understood that the above circuit components and/or the above values are tailored to a particular implementation and may not be representative of the circuit components and/or values that may be used for another implementation (an implementation with a different sized engine, a different type of engine, and/or a different type of ignition system 105, for example). Additionally, it is understood that different and/or alternative components and or different combinations of components may be utilized without departing from the systems and methods described herein.

Figure 5:
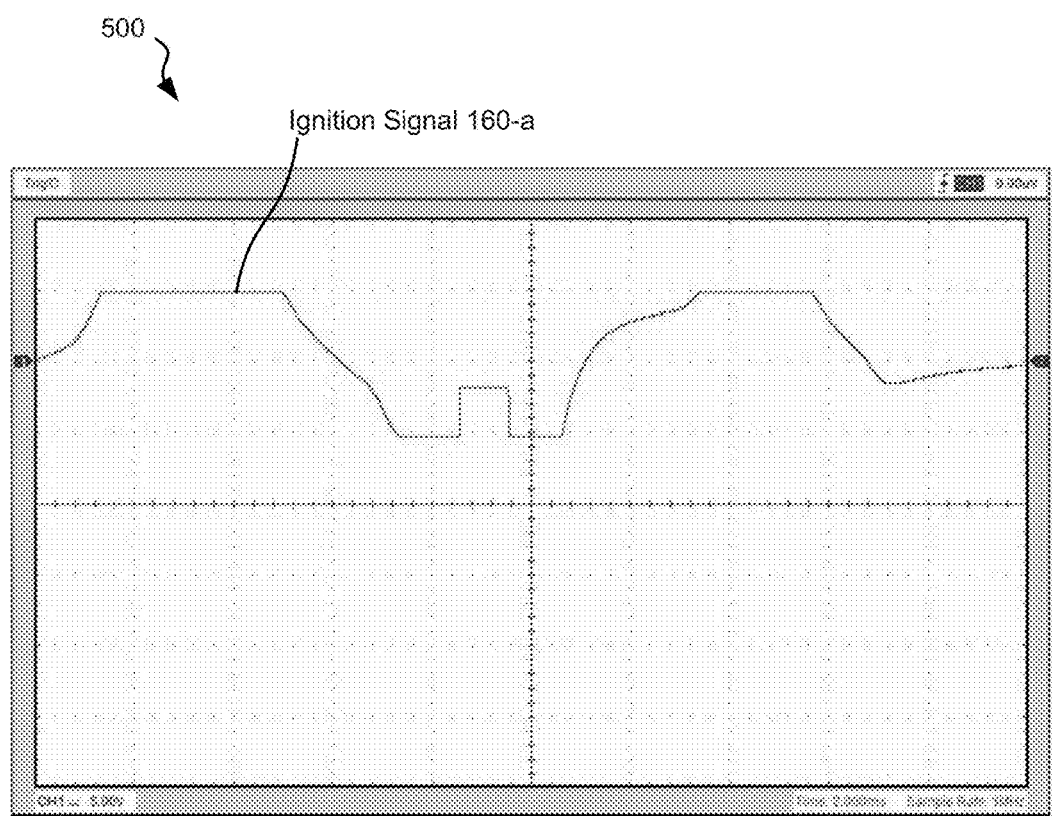
FIG. 5 is a screen shot of an oscilloscope reading of an ignition signal.

FIG. 5 is a screen shot 500 of an oscilloscope reading of an ignition signal 160-*a*. The ignition signal 160-*a* may be an example of the ignition signals 160 illustrated in FIG. 1, 2, 3, or 4. As illustrated in FIG. 5, the ignition signal 160-*a* may be a noisy, high voltage signal that may not readily usable for computation or analysis.

Figure 6:
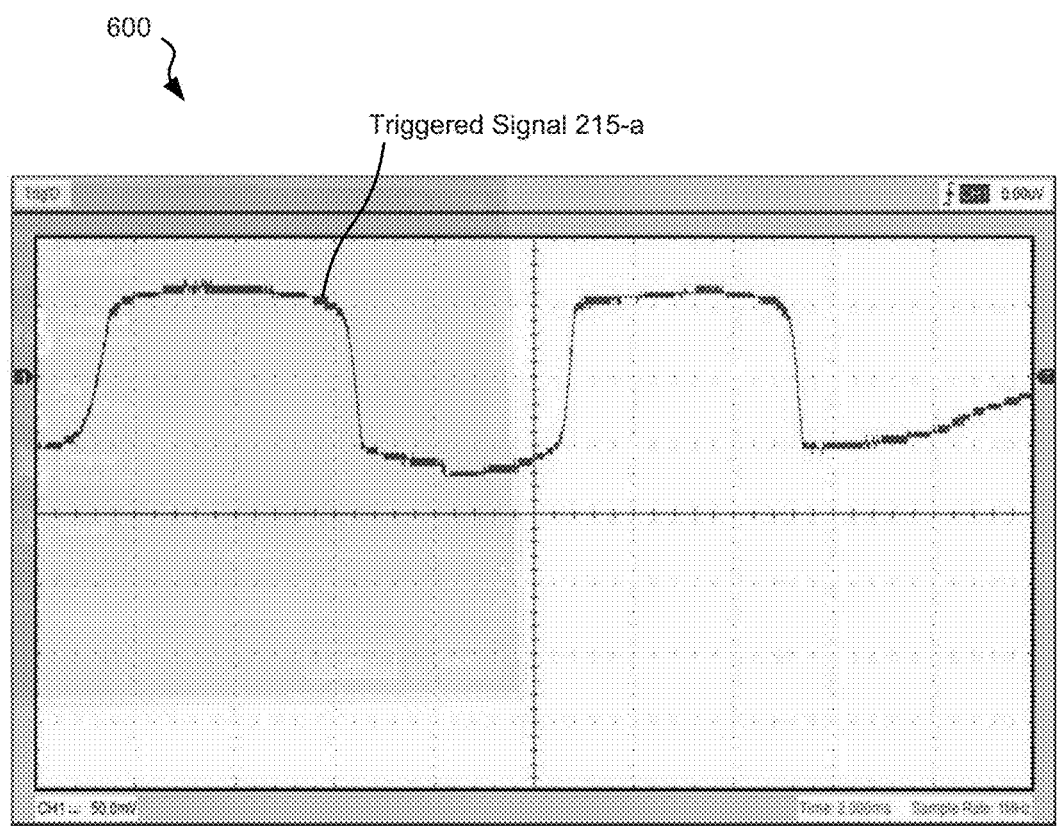
FIG. 6 is a screen shot of an oscilloscope reading of a triggered signal.

FIG. 6 is a screen shot 600 of an oscilloscope reading of a triggered signal 215-*a*. The triggered signal 215-*a* may be an example of the triggered signals 215 illustrated in FIG. 2, 3, or 4. As illustrated in FIG. 6, the triggered signal 215-*a* may be a reduced voltage digital signal waveform with triggered pulses based on the received ignition signal 160 that may be readily usable for computation or analysis.

Figure 7:
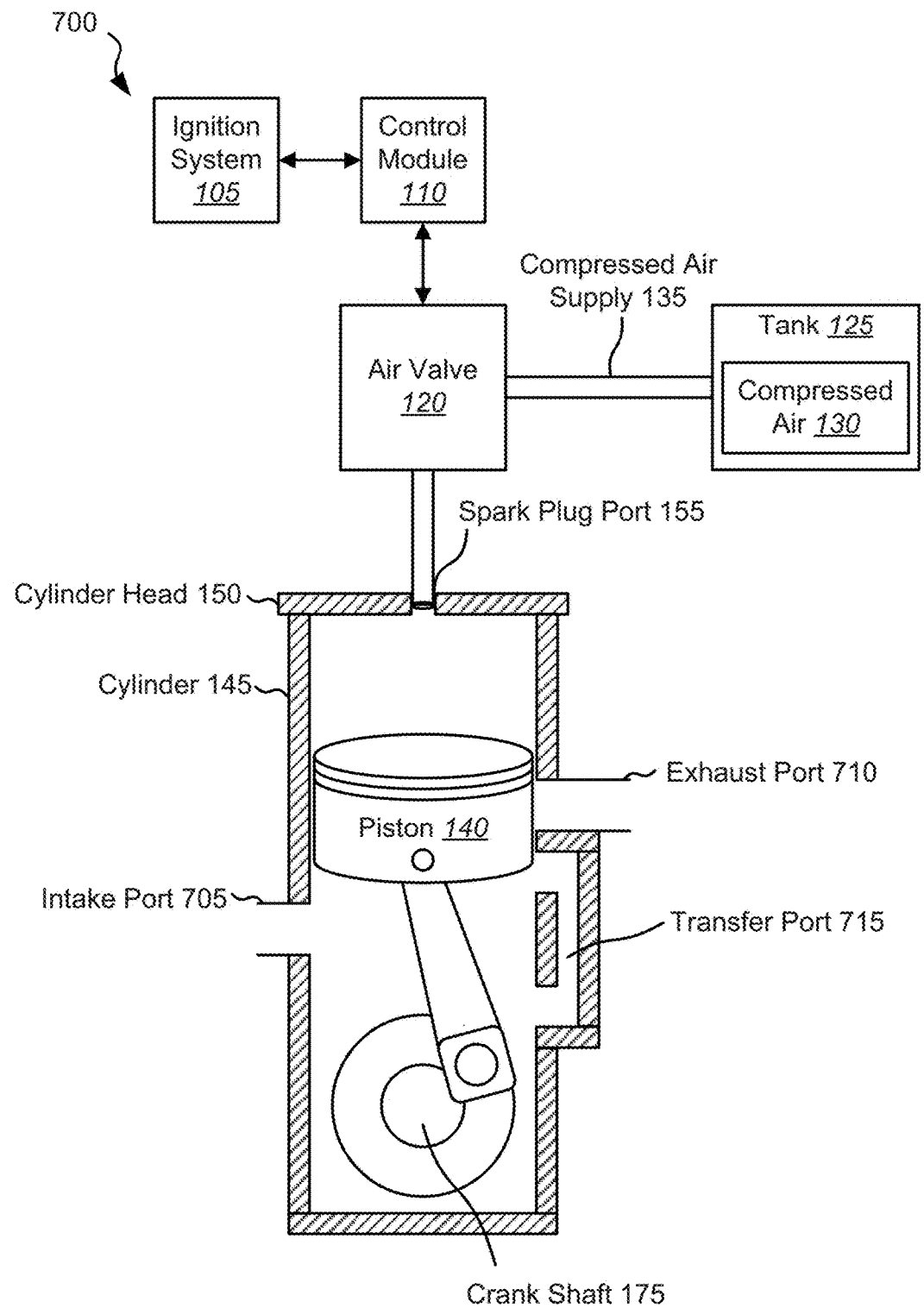
FIG. 7 is a block diagram illustrating one example of a two-stroke engine that is converted to a compressed air engine using the systems and methods described herein.

FIG. 7 is a block diagram illustrating one example of a two-stroke engine that is converted to a compressed air engine using the systems and methods described herein. The two-stroke engine may include a piston 140 within a cylinder 145. Two-stroke engines typically contain less parts than a comparable four-stroke engine. For example, rather than valves to control the intake port 705 and the exhaust port 710, the two-stroke engine may use the movement of the piston 140 to open or close (e.g., block off) the intake port 705 and/or the exhaust port 710. In one example, the piston 140 may receive intake air via a transfer port 715 and the piston 140 may be configured to open or close the transfer port 715 and/or the exhaust port 710. In one example, the air valve 120 may provide compressed air 130 into the cylinder 145 via the spark plug port 155 in the cylinder head 150.

Figures 7A, 7B:
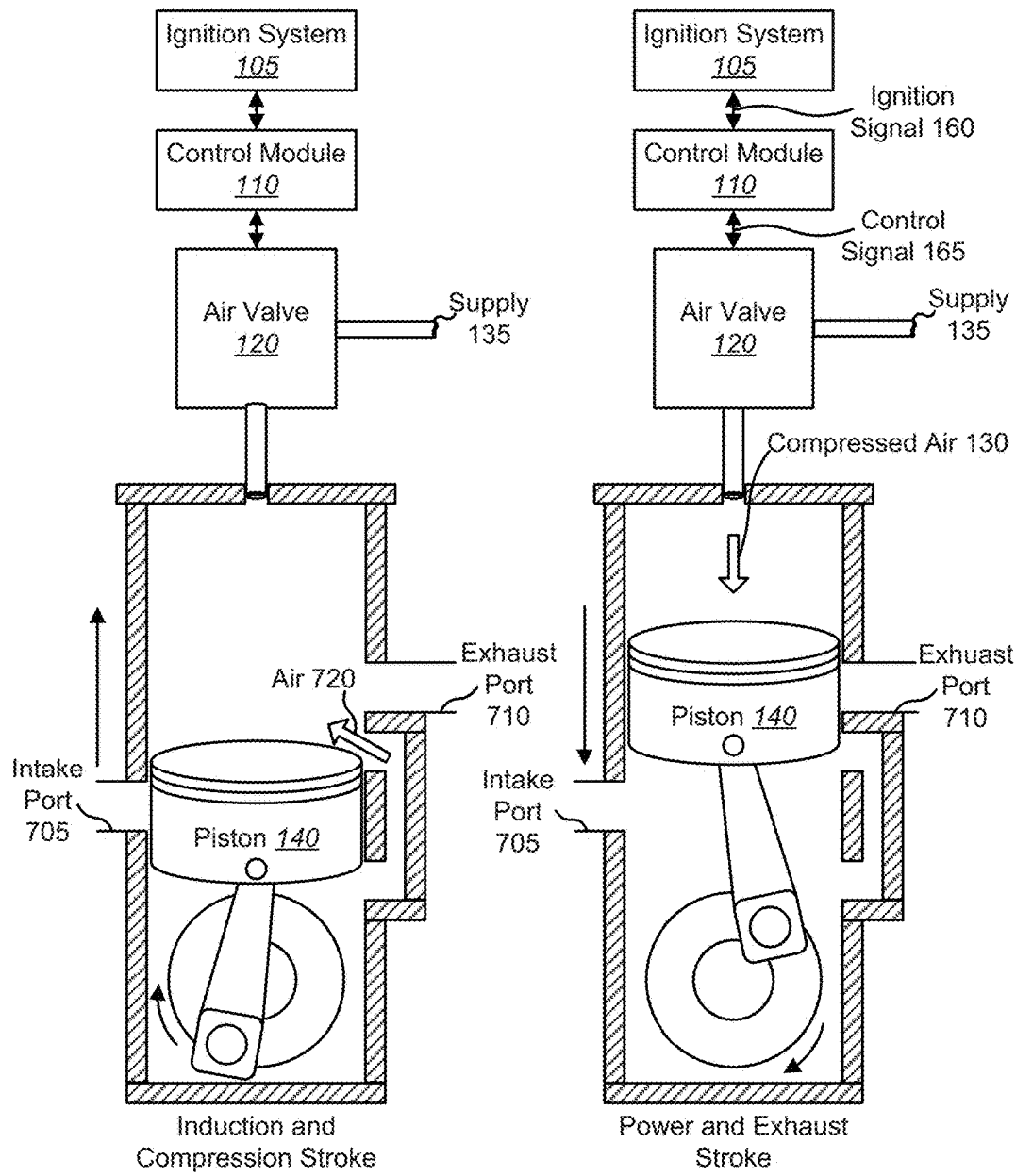
FIGS. 7A-7B illustrate an example of a two-stroke engine.

The two-stroke engine, as illustrated in FIGS. 7A and 7B, has two strokes. During the induction and compression stroke (see FIG. 7A), the transfer port 715 is open and the exhaust port 810 is open for at least a portion of the stroke. As the piston 140 moves upward, air 720 (e.g., fresh air) is induced into the cylinder 145 through the transfer port 715. As the piston 140 continues to move upward, both the transfer port 715 and the exhaust port 710 are closed and the piston 140 compresses the air in the cylinder 145 (in preparation for combustion, for example). During the power portion of the power and exhaust stroke (see FIG. 7B), both the exhaust port 710 and the transfer port 715 are closed with respect to the cylinder 145.

The ignition system 105 may output an ignition signal 160 to trigger a combustion reaction during the power stroke. As described previously, the control module 110 may generate a control signal 165 based at least in part on the received ignition signal 160. During at least a portion of the power stroke (from when the piston 140 is at top dead center until a time before the piston 140 opens the exhaust port 710, for example), the air valve 120 may open as controlled by the control signal 165 and compressed air 130 may be released into the cylinder 145. With both the exhaust port 710 and the transfer port 715 being closed, the expansion of the compressed air 130 may push the piston 140 downward, which drives the engine.

As the piston continues to move downward, the exhaust port 710 is opened and the exhaust escapes via the open exhaust port 710. The cycle may then repeat, beginning with the induction and compression stroke.

Two-stroke engines may have a power stroke each revolution and an ignition signal 160 may be generated by the ignition system 105 each revolution. In these cases, the skip signal module 315 may not skip any pulses, since each pulse (e.g., triggered pulse from an ignition signal 160) corresponds with a power stroke of the engine.

Figure 8:
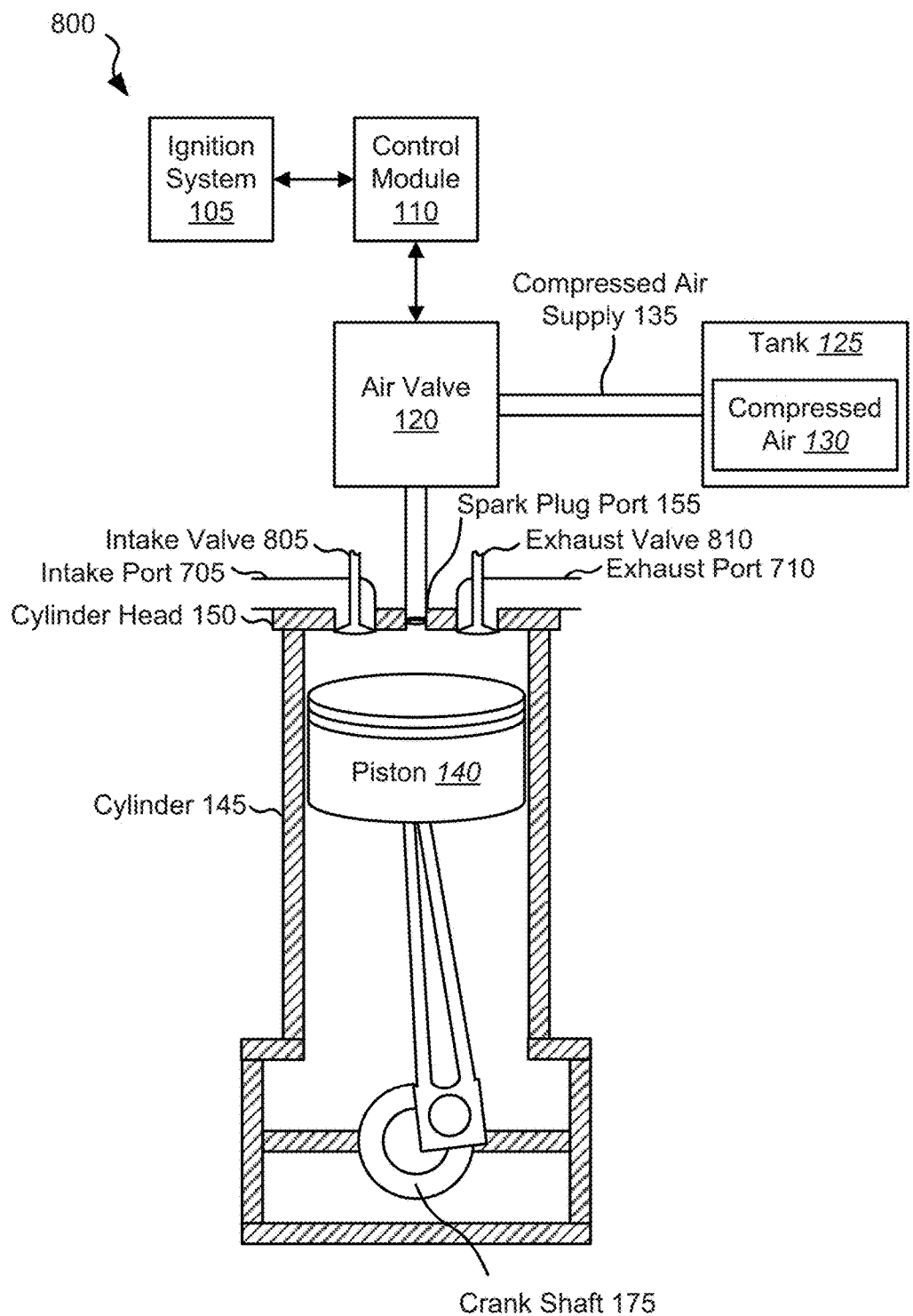
FIG. 8 is a block diagram illustrating one example of a four-stroke engine that is converted to a compressed air engine using the systems and methods described herein.

FIG. 8 is a block diagram illustrating one example of a four-stroke engine that is converted to a compressed air engine using the systems and methods described herein. The four-stroke engine may include a piston 140 within a cylinder 145. Unlike a two-stroke engine, which has a power stroke each revolution, the four-stroke engine has a power stroke every other revolution. Accordingly, the four-stroke engine includes valves (e.g., intake valve 805, exhaust valve 810) to open and close the intake port 705 and the exhaust port 710 based on the stroke of the engine.

The four-stroke engine, as illustrated in FIGS. 8A-8D and 8E-8H, has four strokes. During the intake stroke (see FIGS. 8A, 8E), the intake valve 805 is open and the exhaust valve 810 is closed. As the piston 140 moves downward, the piston 140 draws air 720 into the cylinder 145 through the intake port 705 and the open intake valve 805. During the compression stroke (see FIGS. 8B, 8F), the intake valve 805 is closed and the exhaust valve 810 is closed. As the piston 140 moves upward, the piston 140 compresses the air in the cylinder 145 (in preparation for combustion, for example). During the power stroke (see FIGS. 8C, 8G), the intake valve 805 is closed and the exhaust valve 810 is closed.

The ignition system 105 may output an ignition signal 160 to trigger a combustion reaction during the power stroke. As described previously, the control module 110 may generate a control signal 165 based at least in part on the received ignition signal 160. During at least a portion of the power stroke (from when the piston 140 is at top dead center until a time before the piston is at bottom dead center, for example), the air valve 120 may open as controlled by the control signal 165 and compressed air 130 may be released into the cylinder 145. With both the intake valve 805 and the exhaust valve 810 being closed, the expansion of the compressed air 130 may push the piston 140 downward, which drives the engine.

During the exhaust stroke (see FIGS. 8D, 8H), the intake valve 805 is closed and the exhaust valve 810 is open. As the piston 140 moves upward, the piston 140 pushes out the exhaust 815 through the exhaust port 710 via the open exhaust valve 810. The cycle may then repeat, beginning with the intake stroke.

Four-stroke engines may have a power stroke every other revolution. Accordingly, an ignition signal 160 is only needed every other revolution. In combustion engines, there is no harm in causing a spark at a spark plug during the intake stroke (e.g., a wasted spark) because sparking during the intake stroke does not cause combustion (because there is no fuel to burn during the intake stroke, for example). As a result, four-stroke engines (and other types of engines, for example) can have ignition systems 105 that create an ignition signal 160 every revolution (magneto ignition system 105-a, for example) or that create an ignition signal 160 every other revolution (electronic ignition system 105-b, for example). Depending on the type of ignition system 105, the control module 110 may optionally use the skip signal module 315 to ensure that the air valve 120 is only open during the power stroke. It is noted that the air valve 120 may normally be closed to avoid releasing (and wasting, for example) compressed air 130 when the compressed air 130 can escape through an open valve (e.g., intake valve 805 or exhaust valve 810, port, etc.).

FIGS. 8A-8D illustrate an example of a four-stroke engine that has a magneto ignition system 105-a. As illustrated in FIGS. 8A and 8C, the magneto ignition system 105-a may provide an ignition signal 160 in connection with both the intake stroke (see FIG. 8A) and the power stroke (see FIG. 8C). In one example, the control module 110 may ignore ignition signals 160 that do not correspond with the power stroke. For example, the skip signal module 315 may skip pulses that correspond with ignition signals 160 for strokes that are not power strokes (for the intake stroke, for example). Accordingly, the control module 110 may provide a control signal 165 only in connection with the power stroke (see FIG. 8C).

FIGS. 8E-8H illustrate an example of a four-stroke engine that has an electronic ignition system 105-b. As illustrated in FIG. 8G, the electronic ignition system 105-b may only provide an ignition signal 160 in connection with a power stroke (see FIG. 8G). In these cases, the skip signal module 315 may not skip any pulses, since each pulse (e.g., triggered pulse from an ignition signal 160) corresponds with a power stroke of the engine.

Figure 9:
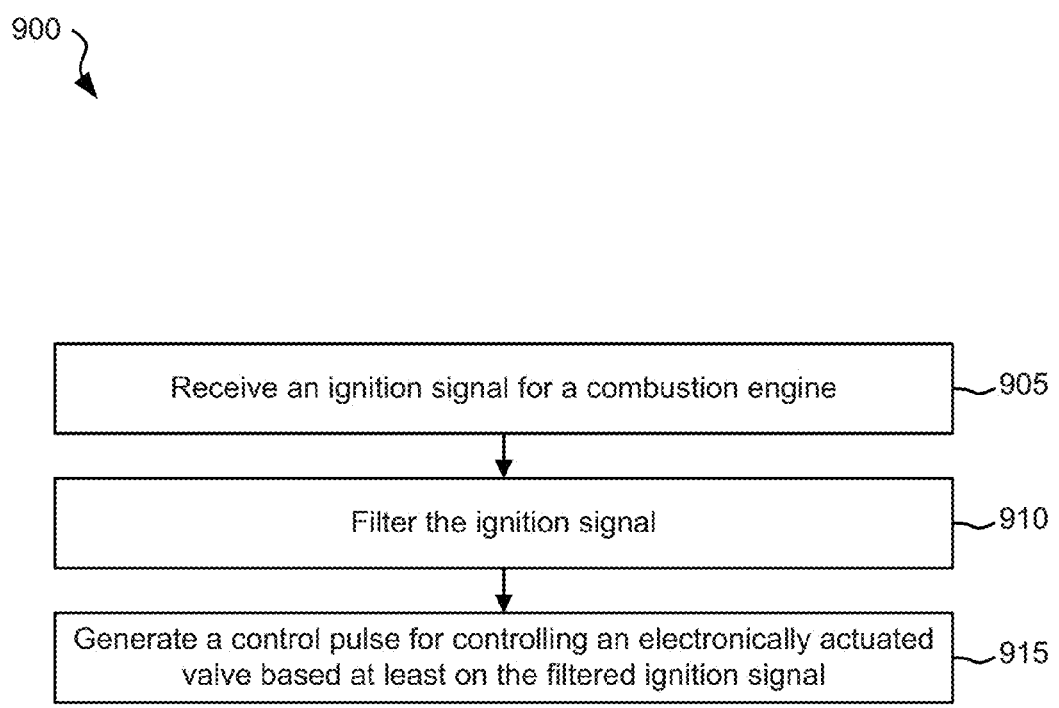
FIG. 9 is a flow diagram illustrating one embodiment of a method for controlling an electronically activated valve.

FIG. 9 is a flow diagram illustrating one embodiment of a method 900 for controlling an electronically activated valve. In this example, the method 900 includes receiving 905 an ignition signal for a combustion engine, filtering 910 the ignition signal, and generating 915 a control pulse for controlling an electronically actuated valve based at least on the filtered ignition signal. Such a method 900 may be implemented by the control module 110 illustrated in FIGS. 1, 2, 3, 4, 7, and/or 8. In some embodiments, the method 900 may be performed in the environment shown in FIGS. 1, 7, and/or 8.

At block 905, an ignition signal for a combustion engine is received. The ignition signal may be from an ignition system (e.g., magneto ignition system, electronic ignition system, etc.). In some cases, the ignition signal may be a high voltage signal that is intended for causing a spark plug to spark (to trigger a combustion reaction, for example).

At block 910, the ignition signal is filtered. As described previously, the ignition signal may be transformed into a digital pulse by triggering on at least a portion of the ignition signal (e.g., the start of the ignition impulse and/or the end of ignition impulse). In addition, the digital pulse may be voltage reduced and filtered for stray voltage. A determination may be made as to whether the ignition signal is a wasted signal or corresponds with a power stroke. If the ignition signal is a wasted signal, the ignition signal may be ignored.

At block 915, a control pulse for controlling an electronically actuated valve may be generated. The control pulse may be generated based at least on the filtered ignition signal. For example, the control pulse may be generated to open the electronically actuated valve during at least a portion of the power stroke in a way that allows a combustion engine to operate using compressed gas (instead of operating using combustion, for example).

Figure 10:
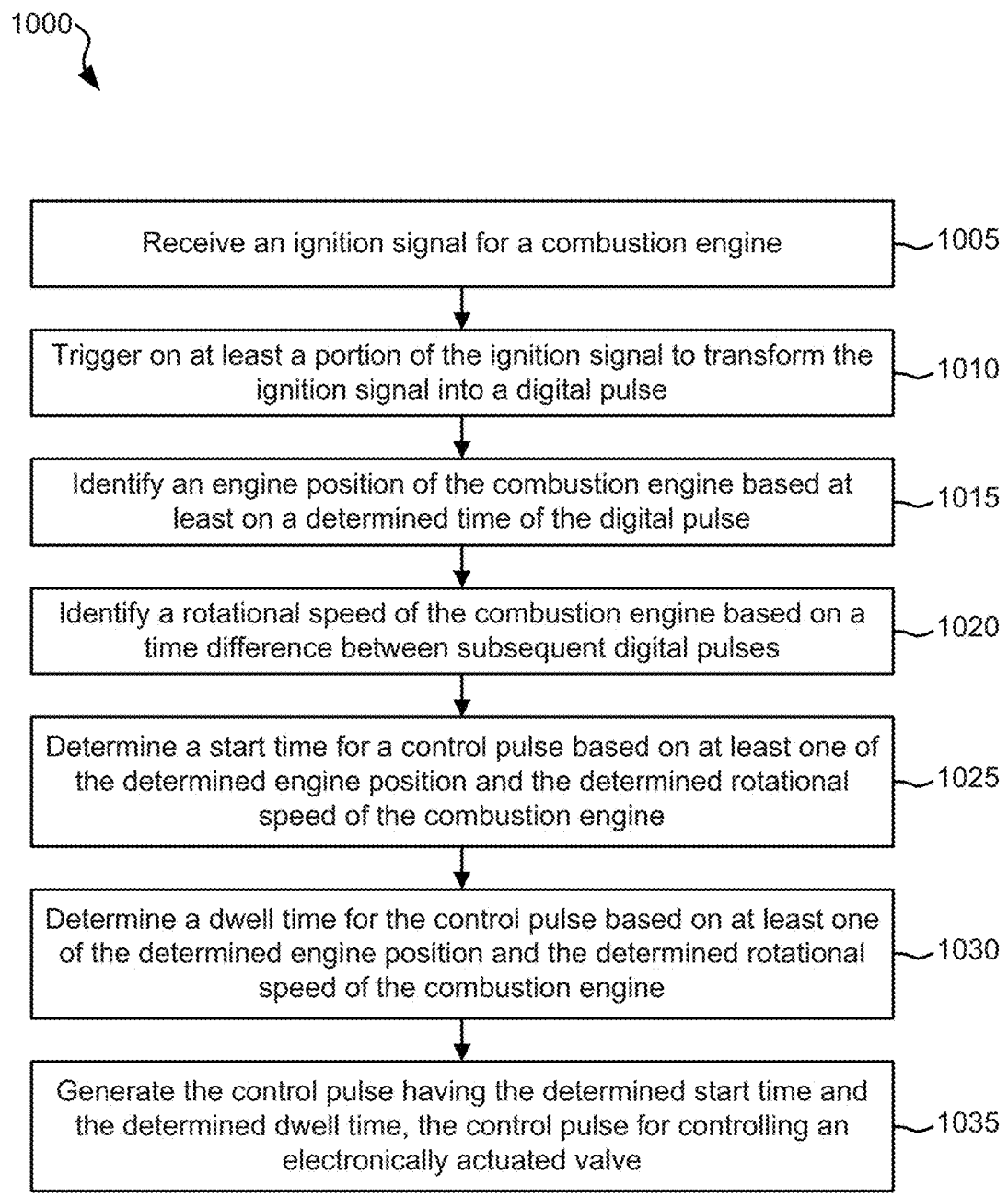
FIG. 10 is a flow diagram illustrating another embodiment of a method for controlling an electronically actuated valve.

FIG. 10 is a flow diagram illustrating another embodiment of a method 1000 for controlling an electronically actuated valve. In this example, the method 1000 includes receiving 1005 an ignition signal for a combustion engine, triggering 1010 on at least a portion of the ignition signal to transform the ignition signal into a digital pulse, identifying 1015 an engine position of the combustion engine based on a determined time of the digital pulse, identifying 1020 a rotational speed of the combustion engine based on a time difference between subsequent digital pulses, determining 1025 a start time for a control pulse based on at least one of the determined engine position and the determined rotational speed of the combustion engine, determining 1030 a dwell time (e.g., duration) for the control pulse based on at least one of the determined engine position and the determined rotational speed of the combustion engine, and generating 1035 the control pulse having the determined start time and the determined dwell time. Such a method 1000 may be implemented by the control module 110 illustrated in FIGS. 1, 2, 3, 4, 7, and/or 8. In some embodiments, the method 1000 may be performed in the environment shown in FIGS. 1, 7, and/or 8.

At block 1005, an ignition signal for a combustion engine is received. At block 1010, at least a portion of the ignition signal is triggered to transform the ignition signal into a digital pulse. In one example, the triggering may generate a substantially rectangular pulse. The pulse may be a digital pulse having substantially two values (e.g., on (1) and off (0)). In some cases, the triggering may be combined with filtering to transform the high voltage ignition signal into a reduced voltage digital pulse.

At block 1015, an engine position of the combustion engine may be identified based at least on a determined time of the digital pulse. In some embodiments, the ignition signal may be configured to send an ignition signal at a precise time. For example, the ignition system may time the sending of the ignition signal to correspond with an optimal time to begin the combustion reaction. Typically, the ignition signal is sent prior to the start of the power stroke (before the piston reaches top dead center) to allow time for the spark to ignite the fuel mixture and trigger the combustion reaction. In some cases, the ignition signal always corresponds with a particular engine position (as produced by a magneto ignition system, for example). In other cases, the ignition signal may be adjusted (e.g., advanced or delayed) to optimize the combustion reaction based on the speed of the engine. In either case, the engine position may be identified based on the timing of one or more digital pulses.

At block 1020, a rotational speed of the combustion engine is identified. As noted previously, the rotational speed may be used to determine the engine position (to account for adjusted timing of ignition signals, for example). In some embodiments, the rotational speed of the combustion engine may be determined by determining a time difference between subsequent digital pulses. In some cases, a shorter duration between ignition signals indicate a faster rotational speed and a longer duration between ignition signals indicate a slower rotational speed. Based on known information about the combustion engine an engine rotations per minute can be determined using this timing difference. Even if the combustion engine adjusts the ignition timing to improve performance under certain conditions (e.g., engine speed, operating temperature, ambient air temperature, etc.) these conditions along with known information about the combustion engine can be used to identify the engine position.

Since the timing of the ignition signal may not correspond with optimal timing for compressed gas delivery, identifying the engine position may enable control pulses (which indicate when compressed gas should be delivered, for example) to be generated at optimal times.

At block 1025, a start time for a control pulse may be determined based on at least one of the determined engine position and the determined rotational speed of the combustion engine. At block 1030, a dwell time for the control pulse may be determined based on at least one of the determined engine position and the determined rotational speed of the combustion engine. As noted previously, the dwell time (e.g., duration) of a control pulse may be reduced when the rotational speed of the combustion engine is higher and increased when the rotational speed of the combustion engine is lower.

At block 1030, the control pulse may be generated. The control pulse may have a start time at the determined start time and may have a dwell time of the determined dwell time. The control pulse may correspond with the opening of an electronically actuated valve. For example, the electronically actuated valve may normally remain closed, but may open at the time and for the duration of each control pulse.

Figure 11:
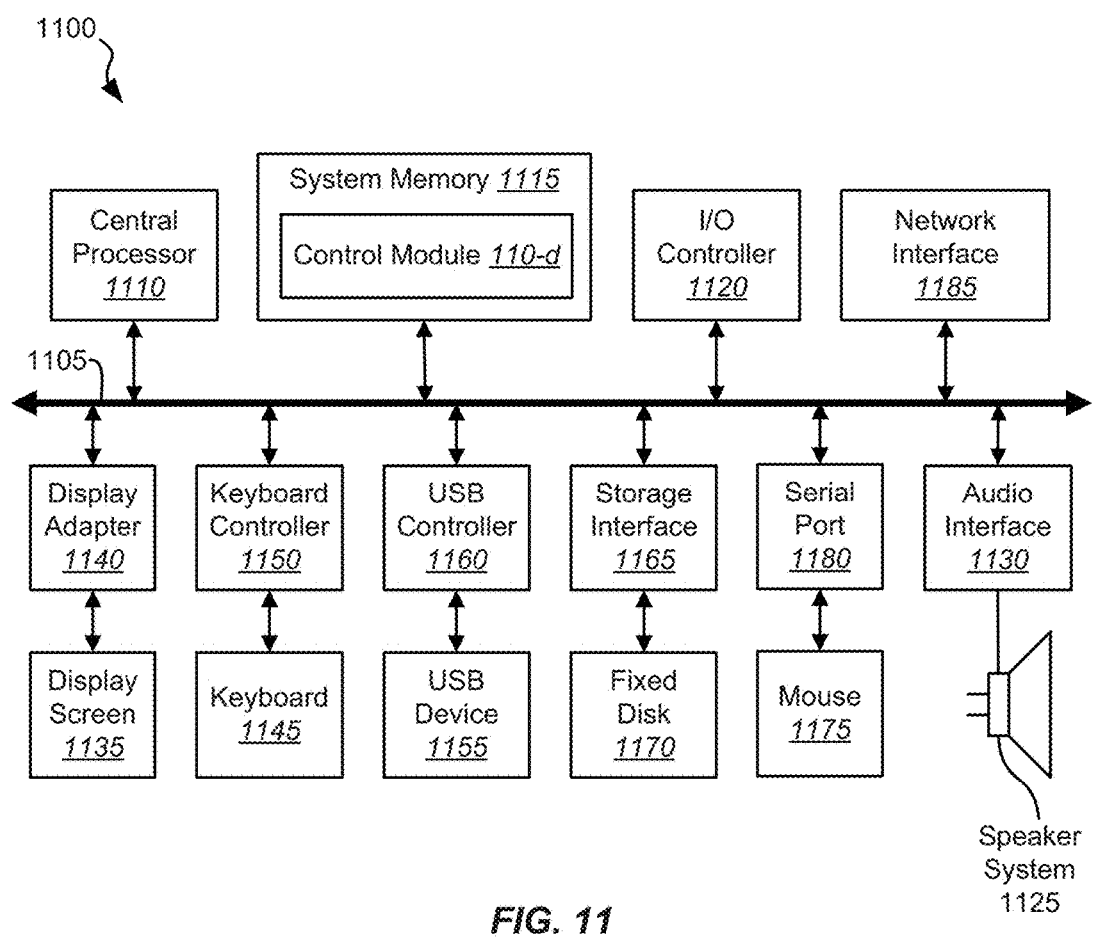
FIG. 11 depicts a block diagram of a controller suitable for implementing the present systems and methods.

FIG. 11 depicts a block diagram of a controller 1100 suitable for implementing the present systems and methods. The controller 1100 may be an example of a controller used to operate the systems 100, 700, and/or 800 as illustrated in FIGS. 1, 7 and/or 8. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1155 (interfaced with a USB controller 1160), one or more serial ports 1180 (interfaced with a mouse 1175, for example), and a storage interface 1165. Also included is a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a control module 110-$d$ may be used to implement the present systems and methods may be stored within the system memory 1115. The control module 110-$d$ may be an example of the control modules 110 illustrated in FIGS. 1, 2, 3, 4, 7, and/or 8. Applications resident with controller 1100 are generally stored on and accessed via a non-transitory computer readable medium, such as a hard disk drive (e.g., fixed disk 1170) or other storage medium. Additionally, applications can be in the form of electronic signals modulated in accordance with the application and data communication technology when accessed via network interface 1185.

Storage interface 1165, as with the other storage interfaces of controller 1100, can connect to a standard computer readable medium for storage and/or retrieval of information, such as a fixed disk drive 1170. Fixed disk drive 1170 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors connect to controller 1100 wirelessly via network interface 1185. In one configuration, the network interface 1185 may include a receiver and transmitter to wirelessly receive and transmit communications via, for example, a cellular network.

Many other devices or subsystems (not shown) may be connected in a similar manner. Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1170. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified)

between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for controlling an electronically actuated valve, comprising:
   receiving an ignition signal for a combustion engine;
   filtering the ignition signal; and
   generating a control pulse for controlling an electronically actuated valve based at least on the filtered ignition signal, wherein the electronically actuated valve controls the release of compressed gas;
   wherein the ignition signal is from an ignition system of the combustion engine, and wherein the ignition system is repurposed from causing a spark plug to spark to control the electronically actuated valve.

2. The method of claim 1, wherein filtering the ignition signal comprises triggering on at least a portion of the ignition signal to transform the ignition signal into a digital pulse.

3. The method of claim 2, wherein filtering the ignition signal comprises removing stray voltage spikes from the digital pulse.

4. The method of claim 2, further comprising:
   identifying an engine position based at least on a determined time of the digital pulse.

5. The method of claim 2, further comprising:
   identifying a rotational speed of the combustion engine based on a time difference between subsequent digital pulses.

6. The method of claim 2, further comprising:
   identifying each digital pulse.

7. The method of claim 6, further comprising:
   outputting a digital pulse for each identified digital pulse.

8. The method of claim 6, further comprising:
   outputting a digital pulse for every two identified digital pulses.

9. The method of claim 1, wherein generating the control pulse comprises:
   determining a start time for the control pulse based on at least one of a determined engine position and a determined rotational speed of the combustion engine;
   determining a dwell time for the control pulse based on at least one of a determined engine position and a determined rotational speed of the combustion engine; and
   generating the control pulse having the determined start time and the determined dwell time.

10. The method of claim 1, wherein the compressed gas is compressed air.

11. An apparatus for controlling an electronically actuated valve, comprising:
    a processor;
    memory in electronic communication with the processor; and
    instructions stored in the memory, the instructions being executable by the processor to:
    receive an ignition signal for a combustion engine;
    filter the ignition signal; and
    generate a control pulse for controlling an electronically actuated valve based at least on the filtered ignition signal, wherein the electronically actuated valve controls the release of compressed gas;
    wherein the ignition signal is from an ignition system of the combustion engine, and wherein the ignition system is repurposed from causing a spark plug to spark to control the electronically actuated valve.

12. The apparatus of claim 11, wherein the instructions to filter the ignition signal comprise instructions executable by the processor to trigger on at least a portion of the ignition signal to transform the ignition signal into a digital pulse.

13. The apparatus of claim 12, wherein the instructions to filter the ignition signal comprise instructions executable by the processor to remove any stray voltage spikes from the digital pulse.

14. The apparatus of claim 12, wherein the instructions are further executable by the processor to:
identify an engine position based on the digital pulse.

15. The apparatus of claim 12, wherein the instructions are further executable by the processor to:
identify a rotational speed of the combustion engine based on a time difference between subsequent digital pulses.

16. The apparatus of claim 12, wherein the instructions are further executable by the processor to:
identify each digital pulse.

17. The apparatus of claim 16, wherein the instructions are further executable by the processor to:
output a digital pulse for each identified digital pulse.

18. The apparatus of claim 16, wherein the instructions are further executable by the processor to:
output a digital pulse for every two identified digital pulses.

19. The apparatus of claim 11, wherein the instructions to generate the control pulse comprise instructions executable by the processor to:
determine a start time for the control pulse based on at least one of a determined engine position and a determined rotational speed of the combustion engine;
determine a dwell time for the control pulse based on at least one of a determined engine position and a determined rotational speed of the combustion engine; and
generate the control pulse having the determined start time and the determined dwell time.

20. The apparatus of claim 11, wherein the compressed gas is compressed air.

* * * * *